US010748554B2

(12) United States Patent
Huang et al.

(10) Patent No.: US 10,748,554 B2
(45) Date of Patent: Aug. 18, 2020

(54) AUDIO SOURCE IDENTIFICATION (71) Applicant: International Business Machines Corporation, Armonk, NY (US)

(72) Inventors: Jing Chang Huang, Shanghai (CN); Guo Qiang Hu, Shanghai (CN); Peng Ji, Nanjing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/249,654

(22) Filed: Jan. 16, 2019

(65) Prior Publication Data

US 2020/0227068 A1 Jul. 16, 2020

(51) Int. Cl.
*G10L 25/51* (2013.01)
*G10L 25/27* (2013.01)
*G10L 25/18* (2013.01)

(52) U.S. Cl.
CPC ............. *G10L 25/51* (2013.01); *G10L 25/18* (2013.01); *G10L 25/27* (2013.01)

(58) Field of Classification Search
None
See application file for complete search history.

(56) References Cited

U.S. PATENT DOCUMENTS

| 9,203,538 | B2 | 12/2015 | Anniballi et al. |
| 10,504,504 | B1 * | 12/2019 | Meltzner ................. G10L 25/51 |
| 2009/0326942 | A1 * | 12/2009 | Fulop ...................... G10L 17/02 |
| | | | 704/246 |

FOREIGN PATENT DOCUMENTS

| CN | 102394062 B | 2/2013 |
| CN | 105654964 A | 6/2016 |
| CN | 107274912 A | 10/2017 |

OTHER PUBLICATIONS

Qin, Tianyun, et al. "Source Cell-Phone Identification in the Presence of Additive Noise from CQT Domain." Information, Aug. 17, 2018. (Year: 2018).*
Moon et al., "Audio Recorder Identification Using Reduced Noise Features," Ubiquitous Information Technologies and Applications, 2014, Lecture Notes in Electrical Engineering, vol. 280, pp. 35-42, Springer, 8 pages.

(Continued)

*Primary Examiner* — James K Mooney
(74) *Attorney, Agent, or Firm* — Amin, Turocy & Watson, LLP (57) ABSTRACT

Embodiments facilitating audio source identification are provided. A computer-implemented method comprises: receiving, by a device operatively coupled to one or more processors, an audio signal under inspection; generating, by the device, an image of time-frequency spectrum of low frequency component and high frequency component of the audio signal; and identifying, by the device, a source of the audio signal based on the generated image and one or more patterns of time-frequency spectrum, wherein each of the one or more patterns is corresponding to low frequency feature and high frequency feature of a specific audio source.

20 Claims, 8 Drawing Sheets

(56) References Cited

OTHER PUBLICATIONS

Das et al., "Do You Hear What I Hear? Fingerprinting Smart Devices Through Embedded Acoustic Components," 2014, ACM Conference on Computer and Communications Security (CCS), ACM, 12 pages.
Yang et al., "Source camera identification based on content-adaptive fusion residual networks," Pattern Recognition Letters, 2017, Elsevier, 10 pages.
Bondi et al., "First Steps Toward Camera Model Identification With Convolutional Neural Networks," IEEE Signal Processing Letters, Mar. 2017, pp. 259-263, vol. 24, No. 3, IEEE, 5 pages.
Chen et al., Camera Model Identification with Residual Neural Network, ICIP, 2017, pp. 4337-4341, IEEE, 5 pages.
Tuama et al., "Camera Model Identification With the Use of Deep Convolutional Neural Networks," IEEE International Workshop on Information Forensics and Security (WIFS), 2016, IEEE, 6 pages.
Baroffio et al., "Camera Identification with Deep Convolutional Networks," Mar. 2016, arXiv:1603.01068v1 [cs.CV], 6 pages.
Qi et al., "Audio Recording Device Identification Based on Deep Learning," IEEE International Conference on Signal and Image Processing (ICSIP), 2016, pp. 426-431, IEEE, 6 pages.

\* cited by examiner

AUDIO SOURCE IDENTIFICATION

BACKGROUND

One or more embodiments relate to audio signal processing, and more specifically, to identification of a source of audio signal based on low frequency and high frequency features of the audio signal.

SUMMARY

With fast growth of usage of multi-media information in forensic evidence, identification of authorship and other purposes, there is growing demand to determine the source of these multi-media information (e.g., the type of camera by which a photo is taken or the specific device by which an audio file is recorded and so on). Unlike photos, audio files normally do not contain any remarkable tag regarding the type or model number of the recording device that is used to record such audio files.

According to one embodiment of the one or more embodiments, there is provided a computer-implemented method facilitating audio source identification. The computer-implemented method, comprises: receiving, by a device operatively coupled to one or more processors, an audio signal under inspection; generating, by the device, an image of time-frequency spectrum of low frequency component and high frequency component of the audio signal; and identifying, by the device, a source of the audio signal based on the generated image and one or more patterns of time-frequency spectrum, wherein each of the one or more patterns is corresponding to low frequency feature and high frequency feature of a specific audio source According to another embodiment of the one or more embodiments, there is provided a system for audio source identification. The system comprises a processing unit. The system also comprises a memory coupled to the processing unit and storing instructions thereon. And the instructions, when executed by the processing unit, perform acts of the above-mentioned method.

According to yet another embodiment of the one or more embodiments, there is provided a computer program product being tangibly stored on a non-transient machine-readable medium and comprising machine-executable instructions, the instruction, when executed on a device, causing the device to perform acts of the above-mentioned method.

BRIEF DESCRIPTION OF THE DRAWINGS

Through the more detailed description of some embodiments of the one or more embodiments in the accompanying drawings, the above and other objects, features and advantages of the one or more embodiments can become more apparent, wherein the same reference generally refers to the same components in the one or more embodiments.

DETAILED DESCRIPTION

Some embodiments can be described in more detail with reference to the accompanying drawings, in which the one or more embodiments have been illustrated. However, the one or more embodiments can be implemented in various manners, and thus should not be construed to be limited to the embodiments disclosed herein.

Figure 1:
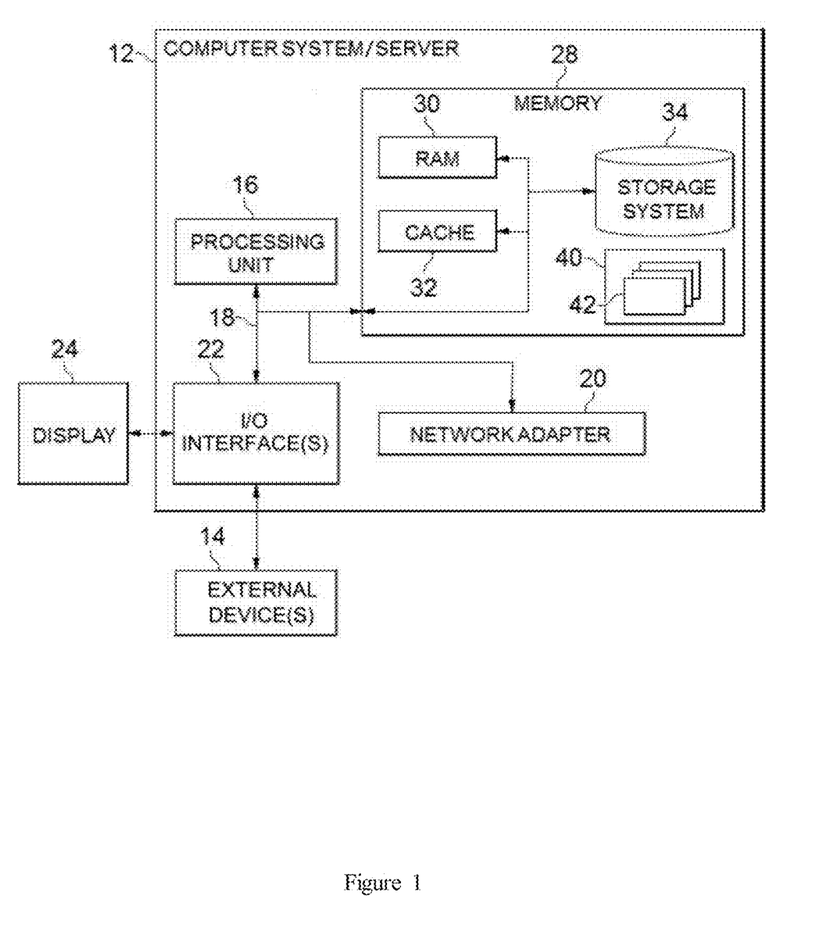
FIG. 1 shows an example computer system which is applicable to implement the one or more embodiments.

Referring now to FIG. 1, an example computer system/server 12 that is applicable to implement the one or more embodiments is shown. FIG. 1 is also adapted to depict an illustrative example of a computer processor which is applicable to implement the one or more embodiments. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As can be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in in conjunction with computer system/server 12. Examples, include, but are not limited to: microcode, device drivers, redundant processing units, external disk drive arrays, RAID systems, tape drives, and data archival storage systems, etc.

There can be different types of devices being used to record the audio, for example, the microphone embedded in a mobile phone, an external earphone mic that is connected to a mobile phone through wired connection or wireless connection, or any other recording devices. There can be various brands of such embedded microphone or recording devices (and, even for the same brand of devices, different models or versions of the devices may vary significantly in their acoustic features because of different manufacturing process and/or materials).

"Source of the audio signal" or "audio source" mentioned in the one or more embodiments refers to the audio recording devices that record the audio, instead of a person who speaks out the audio or a TV or other devices that play out an audio signal. Currently existing solutions to identify the audio source is to extract the intrinsic background noise of each audio signal and find out the corresponding audio source based on the features of the extracted intrinsic background noise. There are basically two problems of these solutions. One is that there is actually no much difference among the intrinsic background noise of all categories. Another problem is that the technology or algorithm used in extracting devices' intrinsic background noise such as wavelets is very time consuming. There is a demand for a solution to identify audio source of audio files with improved efficiency and accuracy.

Figure 2:
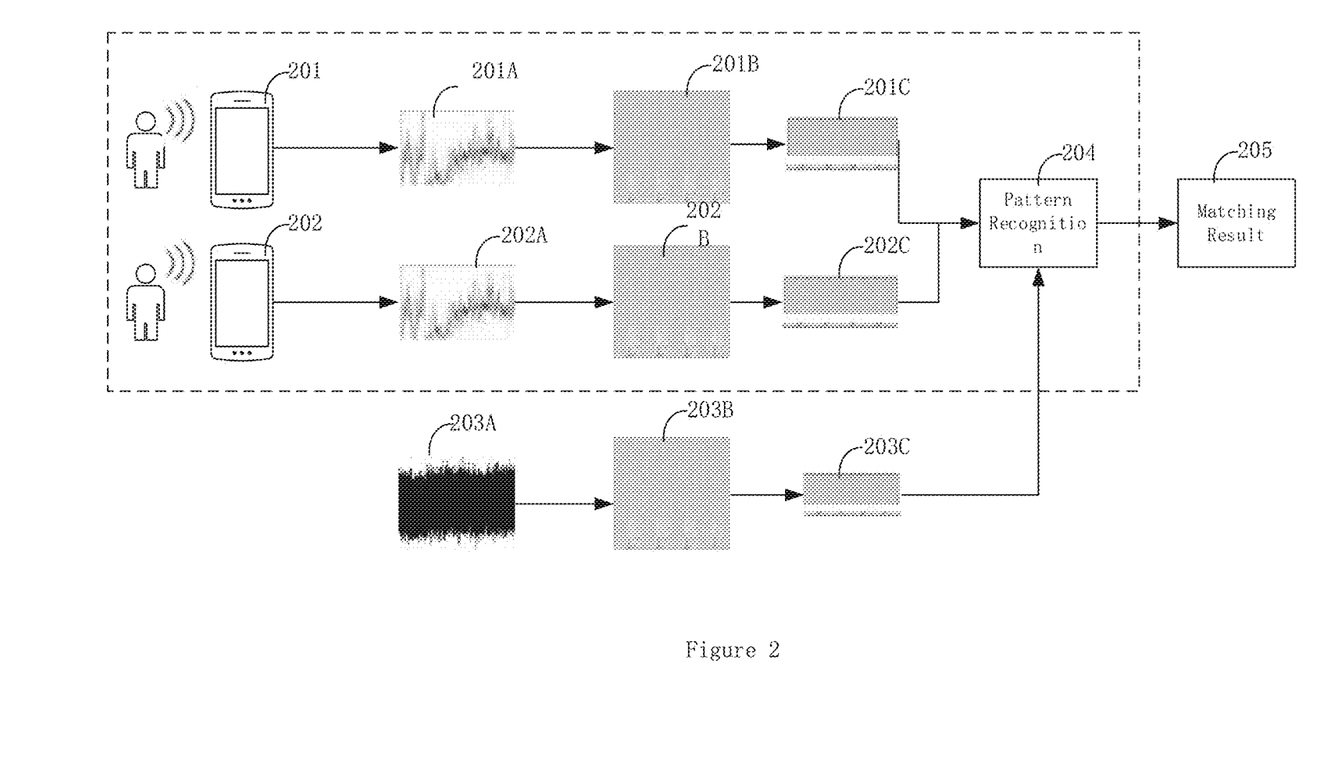
FIG. 2 briefly shows basic work flow of the one or more embodiments described herein.
Figure 4:
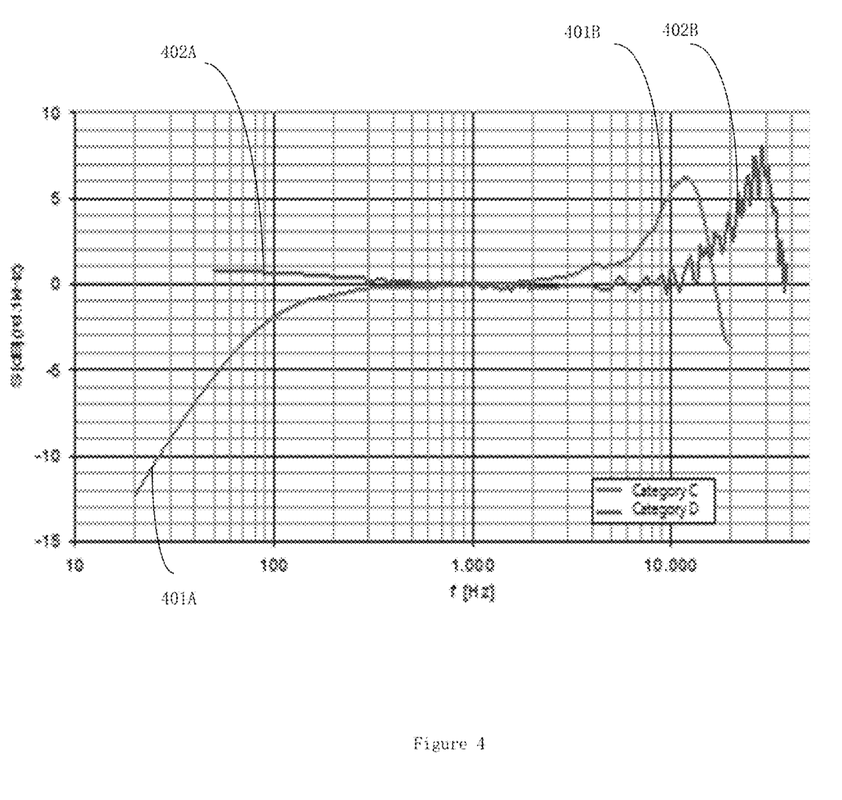
FIG. 4 shows an example frequency response charts of three types of audio recording devices with distinctive features in low frequency and high frequency parts.

With reference now to FIG. 2, a basic work flow of the one or more embodiments is shown. Parts of FIG. 2 included in the dotted block is at learning/training phase, and other parts of FIG. 2 outside the dotted block is at actual inspection phase. As shown in FIG. 2, there are two mobile phones of different types 201 and 202, and each of them has embedded audio recording devices such as micro mics. There are two sample audio files or audio signals 201A and 201B recorded by mobile phones 201 and 202, respectively. The sample audio signals of 201A and 201B are transformed to time-frequency spectral image as 201B and 202B, respectively, through Fourier transformation. Then, the low frequency component and high frequency component can be extracted from the original time-frequency spectral image and can be merged into an image as shown in 201C and 202C respectively. The reason for only extracting low frequency component and high frequency component is that it is found out that the frequency response characteristics of different audio recording devices are distinctive in low frequency part and high frequency part but are not distinctive in other frequency range. FIG. 4 shows an example frequency response charts of two types of audio recording devices (Category C and D) with distinctive features in low frequency and high frequency parts. It can be seen from FIG. 4 that 401A and 401B are the low frequency part and high frequency part of Category C device respectively, while 402A and 402B are the low frequency part and high frequency part of Category D device respectively. It should be understood that FIG. 4 only shows distinctive low frequency and high frequency parts of two types of devices for example purpose in order to show that different types of recording devices have distinctive frequency response features in low frequency and high frequency parts. Then the merged images with only low and high frequency components, 201C and 202C, of the two devices can be provided to pattern recognition module 204, together with the specific brand and type information of devices 201 and 202 respectively. Pattern recognition 204 will thus get the image characteristics related to the low frequency and high frequency components of each specific brand and type of devices 201 and 202.

Later if there is an actual audio signal 203A shown in FIG. 2 of which its audio source needs to be identified, i.e. which specific brand and type of audio devices recorded the audio signal 203A, such audio signal 203A under inspection will be also transformed to time-frequency spectral image 203B using Fourier transformation, and then low frequency component and high frequency component can be extracted from 203B and merged to image 203C. Such image 203C can be fed into the pattern recognition module 204 for pattern matching based on the images' characteristics in order to find out whether the audio signals 203A is recorded by device 201 or device 202. Based on the characteristics of low frequency and high frequency time-spectral images of devices 201 and 202 learned by pattern recognition module 204 during training/learning phase, the incoming image 203C can be matched with either of the pattern of 201 or 202, and the result can be output by matching result module 205.

Based on the above brief description, the solution provided under the one or more embodiments does not need to analyze and match the background noise characteristics of each audio signal under inspection and each type of audio recording devices. On the contrary, the one or more embodiments, through transforming the audio signal in time domain to frequency domain by Fourier transformation and only extracting the low frequency and high frequency parts of the time-frequency spectral image for image pattern recognition, significantly reduces the complexity of computation and improves the accuracy in audio source identification. Only extracting low frequency component and high frequency component is the key idea of the one or more embodiments because these are the frequency ranges in which the frequency response characteristics vary significantly among different types of audio recording devices.

However, the audio recording devices are not necessarily limited to mobile phones. There can be other types of audio recording devices such as external recorder with microphones or ear mics and so on. The two mobile phones 201 and 202 are only for example purpose, and more mobile phones in various types can be used at learning/training phase. Also, at training/learning phase, one sample audio signal is not adequate enough for training the pattern recognition module 204. Certain amount of sample audio signals recorded by a specific type of audio recording device are needed so that the pattern recognition module 204 can learn the hidden pattern of intrinsic features of the device (in specific brand and type) low frequency and high frequency components that are reflected in the time-frequency spectral images.

Figure 3A:
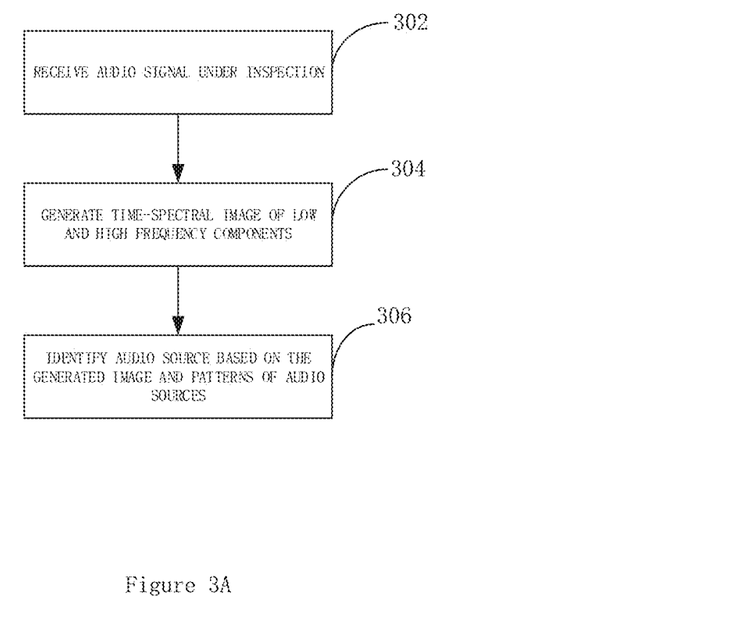
FIG. 3A is a flow chart that shows a computer-implemented method facilitating audio source identification according to one or more embodiments described herein.

FIG. 3A is a flow chart that shows a computer-implemented method facilitating audio source identification according to an embodiment of the one or more embodiments. The method shown in FIG. 3A starts from step 302.

Figure 5A:
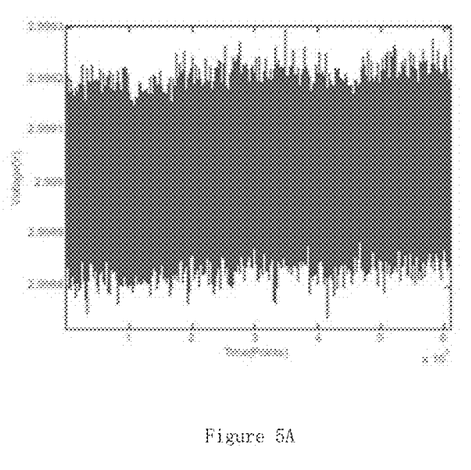
FIG. 5A shows an example audio signal under inspection according to one or more embodiments described herein.

In step 302, an audio signal under inspection is received. Audio signal under inspection means audio signal that people would like to identify its audio source, e.g., which specific brand and type of audio recording device has recorded that audio signal. An example of such received audio signal is shown in FIG. 5A. As can be seen from the FIG. 5A, the audio signal recorded by a certain audio recording device (such as Category C shown in FIG. 4) can be represented as a two-dimension chart, in which the X axis represents the time (points) information and the Y axis represents the voltage (V) information. The two-dimension chart shown in FIG. 5A corresponds to the actual audio wave form in time domain, which can be understood as the original audio signal from the audio recording device.

Then, the method shown in FIG. 3A moves to step 304, at which an image of time-frequency spectrum of low frequency component and high frequency component of the audio signal can be generated. An image of time-frequency spectral of low frequency component and high frequency component is like the image 201C or 202C shown in FIG. 2.

As for the specific value of frequency of "low frequency" and "high frequency" under the one or more embodiments, there is no strict limitation. As a general and common standard in current audio industry, low frequency refers to a frequency range of 10 to 200 Hertz (HZ), and high frequency refers to a frequency range of 5 Kilohertz (KHZ) to 22 KHZ. However, this is only an example illustration of low and high frequency. Persons skilled in the art may adjust the range of low and high frequency under the one or more embodiments based on specific needs, devices or scenarios. The one or more embodiments herein do not exert any restriction on the specific value of low or high frequency mentioned herein.

Figure 3B:
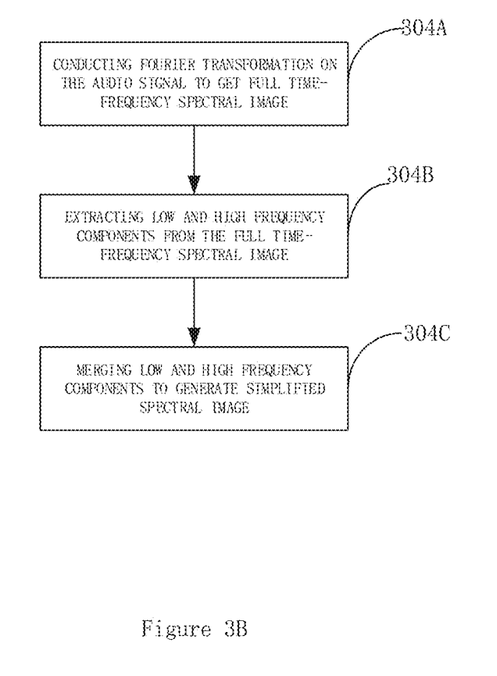
FIG. 3B is a flow chart that shows a computer-implemented method facilitating generating a time-spectral image that only contains low and high frequency components according to one or more embodiments described herein.

Step 304 involves generating an image of time-frequency spectral of low and high frequency components of the audio signal. There can be various embodiments under the one or more embodiments to generate an image of time-frequency spectral of low and high frequency components of the audio signal. FIG. 3B is a flow chart that shows a computer-implemented method facilitating generating a time-spectral image that only contains low and high frequency components according to the one or more embodiments.

As specifically shown in FIG. 3B, step 304 in FIG. 3A can be implemented in three steps, 304A, 304B and 304C. In step 304A, Fourier transformation is conducted on the audio signal to generate a full time-frequency spectral image of the audio signal.

Since the received audio signal is a signal in time domain without specific frequency related information, Fourier transformation can be implemented to transform the audio signal in time domain to time-frequency spectral image in frequency domain. The specific process of Fourier transformation will not be introduced in detail here because this is an existing solution well known to persons skilled in the art. According to an embodiment under the one or more embodiments, the image of time-frequency spectral contains information of time, frequency and decibel (db) of the audio signal.

Figure 5B:
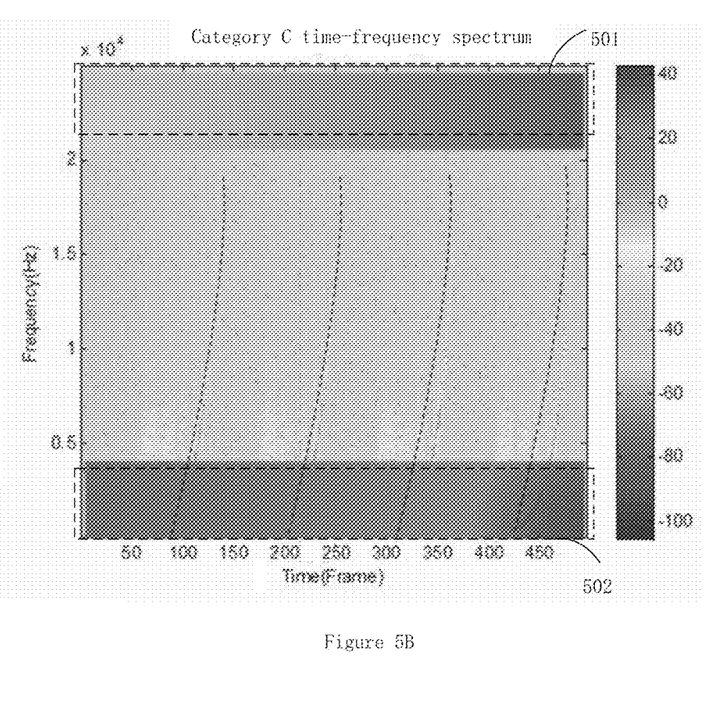
FIG. 5B shows an example time-frequency spectral image that is generated after Fourier transformation on the audio signal in FIG. 5A.

An example of such time-frequency spectral image generated from the original audio signal is shown in FIG. 5B, based on the device of Category C shown in FIG. 4 for example. As can be seen from FIG. 5B, the X axis of the image can represent the time (frame) information, the Y axis of the image can represent the frequency information, and different colors (shades) can be used in the image to represent the decibel (db) information of the audio signal corresponding to specific frequency value, which reflects frequency-response characteristics of specific type of audio recording devices. Since the FIG. 5B is required to be in only black-white format without any other colors, it should be understood that FIG. 5B is only to provide an example showing that decibel (db) information can be embedded in the time-frequency spectral image with different colors or different level of shades. As can be seen from FIG. 5B, the bar on the right side ranging from −100 to 40 provides the legend with different colors for different db values. Persons skilled in the art should understand that the decibel (db) information is logarithm to the result of Fourier transformation on the original audio signal, i.e. a type of dimensional representation of the result of Fourier transformation that is well known to the persons skilled in the art. Therefore, details regarding the process of how to obtain the decibel (db) information will not be introduced.

Figure 5C:
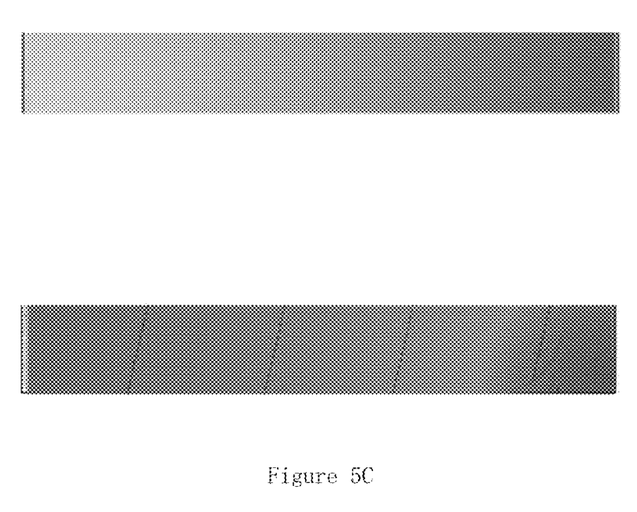
FIG. 5C shows an example low frequency component and high frequency component extracted from the time-frequency spectral image in FIG. 5B.

After step 304A, low frequency component and high frequency component of the time-frequency spectral image can be extracted in step 304B. According to an embodiment of the one or more embodiments, low frequency refers to frequency that is lower than 200 HZ, and the high frequency refers to frequency that is higher than 5 KHZ. As can be seen from the FIG. 5B, the dotted block 501 denotes the high frequency component of the time-frequency spectral image, and dotted block 502 denotes the low frequency component of the time-frequency spectral image. In step 304B, component 501 and 502 are extracted from the full time-frequency spectral image, as shown in FIG. 5C.

Figure 5D:
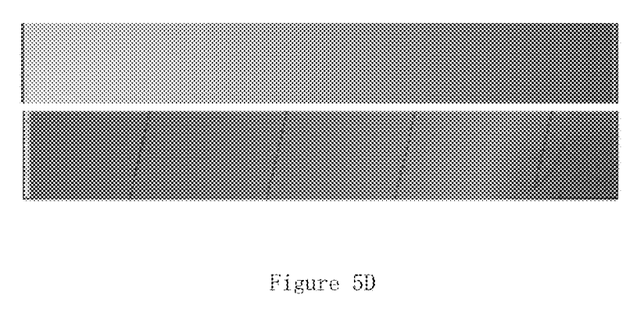
FIG. 5D shows an example merged image from FIG. 5B for identification of audio source according to an embodiment of the one or more embodiments.

Then the method shown in FIG. 3B moves to step 304C. In step 340C, the low frequency component and the high frequency component are merged in order to generate an image of time-frequency spectral of low frequency component and high frequency component of the audio signal. An example of such merged image (or called "simplified image") based on the full time-frequency spectral image is shown in FIG. 5D. As can be seen from FIG. 5D, the finally merged image only contains some parts of the original time-spectral image shown in FIG. 5B, and thus only part of the image information can be used to do subsequent pattern matching to find out the audio source, which significantly reduces the computation burden that is needed.

Such merge of pieces of images into a whole image can be implemented through multiple existing solutions in image processing field that are well known to the persons skilled in the art. Details will not be introduced in this regard.

Until now, step 304 in FIG. 3A has been completed through steps 304A-304C in FIG. 3B according to an embodiment of the one or more embodiments. Persons skilled in the art should understand that there can be other ways to perform step 304. For example, different transformation algorithms can be used to do the transformation from time domain to frequency domain, such as FFT (Fast Fourier transformation) and so on. Also, the specific representation of FIGS. 5B-5D is also for example purposes.

Now let's go back to FIG. 3A. After step 304, the method shown in FIG. 3A moves to step 306 (the same as step 306 after step 304C in FIG. 3B).

In step 306, source of the audio signal can be identified based on the generated image (i.e. the merged image as shown in FIG. 5D for example) and one or more patterns of time-frequency spectral, wherein each of the one or more patterns is corresponding to features of low frequency and high frequency of a specific audio source. Here the term "audio source" refers to specific brand and type of audio recording device.

According to an embodiment of the one or more embodiments, the identification in step 306 can be implemented by matching the generated image with the one or more patterns to identify the audio source through matching the image pixels. Here for example, the existing one or more patterns of time-frequency spectral have been stored beforehand as template images. Therefore, the generated image in step 304 can be compared with those template images to find out which template image can best match the generated image, and then the audio source corresponding to the best matched template image can be identified as the audio source of the audio signal. However, since the time-spectral image of different audio signal recorded through the same audio recording device can be quite distinctive, it can be difficult, time consuming and inaccuracy to conduct such pixel-by-pixel image comparison between the generated image and template images that are corresponding to specific audio sources respectively.

According to another embodiment of the one or more embodiments, pattern recognition can be conducted on the generated images to identify the audio source through deep learning technology by leveraging neural network. According to an embodiment of the one or more embodiments, pattern recognition can be implemented through Convolutional Neural Network (CNN). According to another embodiment of the one or more embodiments, pattern recognition can be implemented through Recurrent Neural Network (RNN). Since the generated image for pattern recognition is an image without time related information, CNN can be used instead of RNN to reduce the complexity of computation. However, there is no limitation on the specific type of neural network for pattern recognition under the one or more embodiments.

According to the embodiment where CNN is leveraged for pattern recognition to identify the audio source in step 306, the following specific steps can be implemented. First, the generated image is fed to a CNN. Then, features related to low frequency and high frequency can be extracted from the generated image. It is to be understood that the generated image contains the components of low and high frequency of the time-spectral image transformed from original audio signal through Fourier transformation. So, different recorded audio input may cause different time-spectral image, and thus different generated images. Therefore, direct image match (pixel by pixel) sometimes is not feasible. It is needed to identify the intrinsic feature from the generated image, i.e. the features related to the audio source's low and high frequency response, irrelevant with the actual audio signal that is recorded. Then, such extracted features can be compared with one or more patterns to determine the matched pattern, and the audio source that is corresponding to the matched pattern can be identified as the source of the audio signal under inspection.

Persons skilled in the art shall understand that this is a normal process to conduct image pattern recognition through CNN or RNN or other types of neural networks in the deep learning field. For example, the neural network can be trained with a large number of images of different cats or dogs to learn the intrinsic features of cats or dogs. Then an actual image of a cat or a dog under inspection can be fed into the neural network and the neural network will give a result in determining whether the input image shows a cat, or a dog based on the extraction of intrinsic features of the input image and pattern recognition between the input image and learned hidden pattern during training phase. This is a standard process of machine learning through neural network. The detail algorithms and process of such pattern recognition can be leveraged by persons skilled in the art and thus will not be introduced in detail here.

Figure 3C:
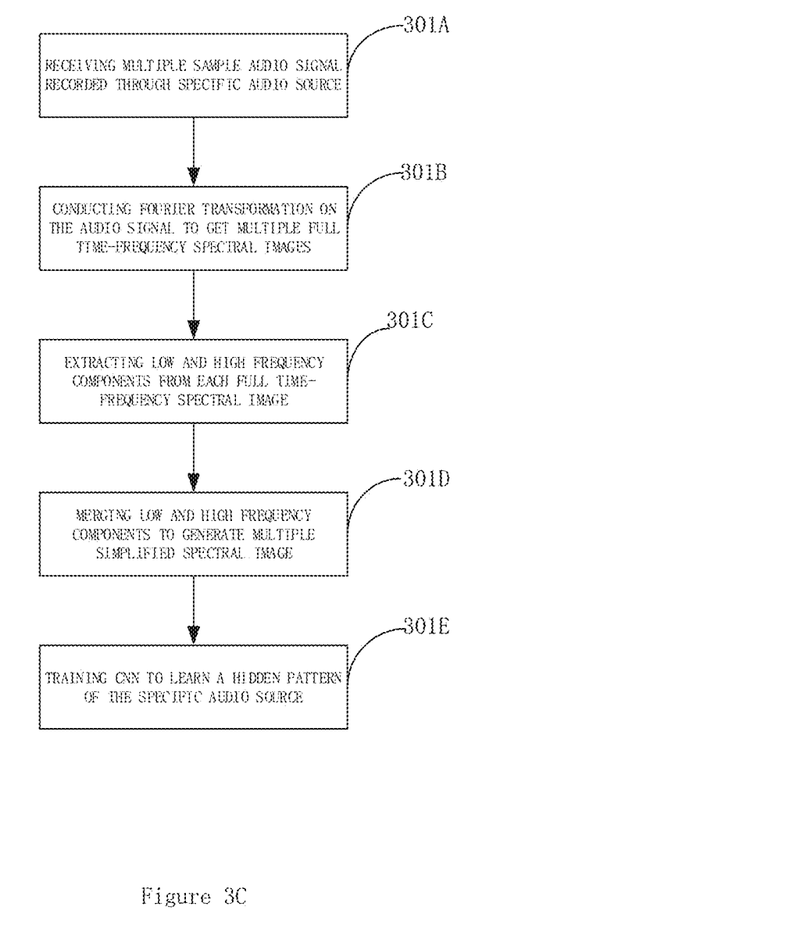
FIG. 3C is a flow chart that shows a computer-implemented method facilitating obtaining a pattern corresponding to features of low and high frequency of a specific audio source according to one or more embodiments described herein.

As mentioned above, when leveraging neural network in doing the pattern recognition, there is a learning/training phase. According to an embodiment of the one or more embodiments, the method shown in FIG. 3A further comprises a step of obtaining one or more patterns corresponding to one or more specific audio sources respectively at training/learning phase. FIG. 3C is a flow chart that shows a computer-implemented method facilitating obtaining a pattern corresponding to features of low and high frequency of a specific audio source according to the one or more embodiments.

In FIG. 3C, the method starts from step 301A. In step 301A, multiple sample audio signal recorded through the specific audio source is received. In order to create adequate number of training examples to improve the accuracy of the audio source identification, a certain audio source will need to record multiple sample audio signals. The multiple audio signals can be made through different users at different ages or from different countries to increase variety of the audio signals.

Then at step 301B, Fourier transformation is also conducted on the sample audio signals to generate multiple template full time-frequency spectral images of the sample audio signals.

Then at step 301C, low frequency component and high frequency component of each of the template full time-frequency spectral images are extracted to generate multiple template images corresponding to the specific audio source.

At step 301D, low and high frequency components of each of the template full time-spectral images are merged to generate multiple template images corresponding to the specific audio source.

Finally, at step 301E, the neural network (like CNN) can be trained with the multiple template images to learn a hidden pattern of the specific audio source that is related to features of low frequency and high frequency corresponding to the specific audio source.

It should be understood that steps 301B-301D are similar to the steps of 304A-304C shown in FIG. 3B. So, they will not be explained in detail again here. As for the step of 301E, persons skilled in the art can understand that it can be done using currently available mature solutions in machine learning. The intrinsic features of different audio sources, i.e. the distinctive frequency response characteristics in low frequency and high frequency can be learned through the machine learning technology using neural networks.

Once the hidden pattern of each specific audio source is learned, the generated image during actual inspection phase can be done with pattern matching with the learned pattern. So that the audio source of the audio signal under inspection can be identified.

It should be emphasized that machine learning/deep learning or specific type of neural network are only examples for doing the pattern recognition under the one or more embodiments. Persons skilled in the art can use different existing technologies to identify the audio source as long as the image containing low frequency and high frequency time-spectral information is generated under the one or more embodiments.

It should be noted that the processing of audio source identification according to embodiments of this disclosure can be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the one or more embodiments.

Aspects of the one or more embodiments are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the one or more embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the one or more embodiments have been presented for purposes of illustration but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by a device operatively coupled to one or more processors, an audio signal under inspection;
    generating, by the device, a merged image of a time-frequency spectrum of a low frequency component and a high frequency component of the audio signal;
    identifying, by the device, a source that recorded the audio signal based on the generated image and one or more source patterns of the time-frequency spectrum, wherein each of the one or more source patterns is corresponding to a low frequency feature and a high frequency feature of a specific audio source; and
    detecting, by the device, a brand and a type of the source that recorded the audio signal.

2. The computer-implemented method of claim 1, wherein the generating comprises:
    conducting Fourier transformation, by the device, on the audio signal to generate a full time-frequency spectral image of the audio signal;
    extracting, by the device, the low frequency component and the high frequency component of the source time-frequency spectral image; and
    combining, by the device, an extracted low frequency component and an extracted high frequency component to generate the merged image of time-frequency spectrum of the audio signal.

3. The computer-implemented method of claim 1, wherein the identifying comprises: comparing, by the device, the generated image with the one or more patterns through image pixel matching to identify the source of the audio signal.

4. The computer-implemented method of claim 1, wherein the identifying comprises:
    feeding, by the device, the generated image to a convolutional neural network (CNN);
    extracting, by the device, the low frequency feature and the high frequency feature from the generated image through the CNN;
    comparing, by the device, the extracted low frequency feature and the high frequency feature with the one or more patterns to determine the matched pattern through the CNN; and
    identifying, by the device, an audio source that corresponds to the matched pattern as the source of the audio signal under inspection through the CNN.

5. The computer-implemented method of claim 1, further comprising:
    obtaining, by the device, the one or more patterns corresponding to one or more specific audio sources respectively.

6. The computer-implemented method of claim 5, wherein the obtaining comprises:
    receiving, by the device, multiple sample audio signals recorded through the specific audio source;
    conducting Fourier transformation, by the device, on the sample audio signals to generate multiple template full time-frequency spectral images of the sample audio signals;
    extracting, by the device, low frequency component and high frequency component of each of the template full time-frequency spectral images of the multiple sample audio signals;
    merging, by the device, the low frequency component and the high frequency component of each of the template full time-frequency spectral images to generate multiple template images corresponding to the specific audio source; and
    training, by the device, a convolutional neural network with the multiple template images to learn a hidden pattern of the specific audio source that is related to features of low frequency and high frequency corresponding to the specific audio source.

7. The computer-implemented method of claim 1, wherein the low frequency refers to frequency below 200 Hz, and the high frequency refers to frequency above 5 KHz.

8. The computer-implemented method of claim 1, wherein the specific audio source has a frequency response characteristic in low frequency and high frequency that is distinct from other audio sources.

9. The computer-implemented method of claim 1, wherein the image of time-frequency spectrum contains information of time, frequency and decibel (dB) of the audio signal.

10. A system, comprising:
    a memory that stores computer executable components; and
    a processing unit operably coupled to the memory, and that executes the computer executable components stored in the memory, wherein the computer executable components comprise:
        at least one computer-executable component that:
            receives an audio signal under inspection;
            generates a merged image of a time-frequency spectrum of a low frequency component and a high frequency component of the audio signal;
            identifies a source that recorded the audio signal based on the generated image and one or more source patterns of the time-frequency spectrum, wherein each of the one or more source patterns corresponds to a low frequency feature and a high frequency feature of a specific audio source; and
detects a brand and a type of the source that recorded the audio signal.

11. The system of claim 10, wherein the generation comprises:
a conducting of Fourier transformation on the audio signal to generate a full time-frequency spectral image of the audio signal;
extraction of the low frequency component and the high frequency component of the source time-frequency spectral image; and
a combining of the extracted low frequency component and the extracted high frequency component to generate the merged image of time-frequency spectrum of the audio signal.

12. The system of claim 10, wherein the identification comprises:
a comparing of the generated image with the one or more patterns through image pixel matching to identify the source of the audio signal.

13. The system of claim 10, wherein the identification comprises:
a feeding of the generated image to a convolutional neural network (CNN);
extraction of the low frequency feature and the high frequency feature from the generated image through the CNN;
a comparing of the low frequency feature and the high frequency feature with the one or more patterns to determine the matched pattern through the CNN; and
identification of an audio source that corresponds to the matched pattern as the source of the audio signal under inspection through the CNN.

14. The system of claim 10, wherein the at least one computer-executable component also:
obtains the one or more patterns corresponding to one or more specific audio sources respectively.

15. The system of claim 14, wherein the obtaining comprises:
a receiving of multiple sample audio signals recorded through the specific audio source; and
a conducting of Fourier transformation on the sample audio signals to generate multiple template full time-frequency spectral images of the sample audio signals;
extraction of low frequency component and high frequency component of each of the template full time-frequency spectral images of the multiple sample audio signals;
a merging of the low frequency component and the high frequency component of each of the template full time-frequency spectral images to generate multiple template images corresponding to the specific audio source; and
a training of a convolutional neural network with the multiple template images to learn a hidden pattern of the specific audio source that is related to features of low frequency and high frequency corresponding to the specific audio source.

16. The system of claim 10, wherein the low frequency refers to frequency below 200 Hertz (Hz), and the high frequency refers to frequency above 5 Kilohertz (KHz).

17. The system of claim 10, wherein the specific audio source has a frequency response characteristic in low frequency and high frequency that is distinctive from other audio sources.

18. The system of claim 10, wherein the image of time-frequency spectrum contains information of time, frequency and decibel (dB) of the audio signal.

19. A computer program product facilitating identification of a source of audio signal based on low frequency and high frequency features of the audio signal, the computer program product comprising a non-transitory computer readable storage medium having program instructions embodied therewith, the program instructions executable by one or more processors to cause the one or more processors to:
receive, by the one or more processors, an audio signal under inspection;
generate, by the one or more processors, a merged image of a time-frequency spectrum of a low frequency component and a high frequency component of the audio signal;
identify, by the one or more processors, a source that recorded the audio signal based on the generated image and one or more source patterns of the time-frequency spectrum, wherein each of the one or more source patterns is corresponding to low frequency feature and high frequency feature of a specific audio source; and
detect, by the one or more processors, a brand and a type of the source that recorded the audio signal.

20. The computer program product of claim 19, wherein the generation comprises:
a conducting Fourier transformation on the audio signal to generate a full time-frequency spectral merged image of the audio signal;
extraction of the low frequency component and the high frequency component of the source time-frequency spectral image; and
a combining the low frequency component and the high frequency component to generate the merged image of time-frequency spectrum of the audio signal.

* * * * *